(12) United States Patent
Berthaud et al.

(10) Patent No.: US 8,589,211 B2
(45) Date of Patent: Nov. 19, 2013

(54) AIRLINE TICKET CHANGE CONSTRAINER

(75) Inventors: Sébastien Berthaud, Antibes (FR);
Thierry Dufresne, Opio (FR); Hervé Prezet, Mougins (FR); Jean-Paul Otmani, La Martre (FR); Fraidoun Sultani, Grasse (FR)

(73) Assignee: Amadeus S.A.S., Sophia Antipolis (FR)

( * ) Notice: Subject to any disclaimer, the term of this patent is extended or adjusted under 35 U.S.C. 154(b) by 783 days.

(21) Appl. No.: 11/855,406

(22) Filed: Sep. 14, 2007

(65) Prior Publication Data

US 2008/0114623 A1    May 15, 2008

Related U.S. Application Data

(63) Continuation-in-part of application No. 11/599,380, filed on Nov. 15, 2006.

(51) Int. Cl.
 *G06Q 10/00* (2012.01)
 *G06Q 30/00* (2012.01)
 *G06F 17/00* (2006.01)
 *G06G 7/00* (2006.01)

(52) U.S. Cl.
 USPC ........... 705/7.35; 705/1.1; 705/7.11; 705/400

(58) Field of Classification Search
 USPC ..................................... 705/5, 7.35, 400, 1.1
 See application file for complete search history.

(56) References Cited

U.S. PATENT DOCUMENTS

| | | |
|---|---|---|
| 2002/0156715 A1 | 10/2002 | Wall et al. |
| 2002/0178034 A1 | 11/2002 | Gardner et al. |
| 2005/0125265 A1* | 6/2005 | Bramnick et al. ............... 705/5 |
| 2006/0064333 A1 | 3/2006 | Razza et al. |
| 2008/0004917 A1 | 1/2008 | Mortimore |
| 2008/0010101 A1 | 1/2008 | Williamson et al. |
| 2008/0010102 A1 | 1/2008 | Williamson et al. |
| 2008/0010103 A1 | 1/2008 | Williamson et al. |
| 2008/0010104 A1 | 1/2008 | Williamson et al. |
| 2008/0027768 A1 | 1/2008 | Thurlow et al. |
| 2008/0041945 A1 | 2/2008 | Williamson et al. |
| 2008/0091481 A1 | 4/2008 | Messa et al. |

* cited by examiner

*Primary Examiner* — George Chen
(74) *Attorney, Agent, or Firm* — Wood, Herron & Evans LLP

(57) ABSTRACT

An automated system and a method for checking an already issued airline ticket prior to having a requester submitting a change request of the already issued airline ticket are described. The system comprises a ticket data retriever unit for retrieving, with a ticket reference provided by the requester, the already issued airline ticket from a ticket database. Then, an issued fare rule finder element retrieves, from a rule database, one or more rule scenarios applying to the already issued airline ticket and governing what changes are permitted. After which a decision module element combines the one or more rule scenarios into a set of permitted options and restrictions and deliver them to the requester. Hence, the requester knows all about the permitted options and restrictions prior to actually requesting to change the already issued airline ticket.

11 Claims, 12 Drawing Sheets

Prior Art

| Scenario | Pricing Method |
|---|---|
| 01 | Keep the fares of the original ticket |
| 02 | Use fares valid at ticket issue. |
| 03 | -Keep the fares of the original ticket for fully traveled part of the journey;<br>-Use today fares for not traveled part of the journey. |
| 04 | -Keep the fares of the original ticket for fully changed part of the journey;<br>-Use today fares for not changed part of the journey. |
| 05 | Use today fares |
| 06 | IATA Reissue Provisions |
| 07 | Use today fare and keep fare construction |
| 08 | Cancel and Start Over |
| 09 | -Use fares valid at ticket issue for fully traveled part of the journey;<br>-Use today fares for not traveled part of the journey. |
| 10 | -keep the fares of the original ticket for changed part of the journey;<br>-Use today fares for not changed part of the journey. |
| 11 | -keep the fares of the original ticket for changed part of the journey;<br>-Use fares valid at ticket issue for not changed part of the journey. |

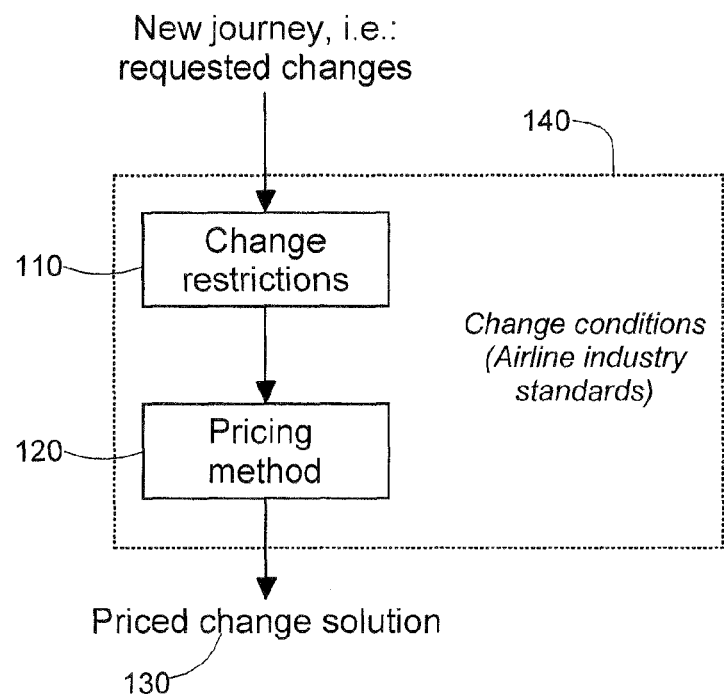

FIG.1

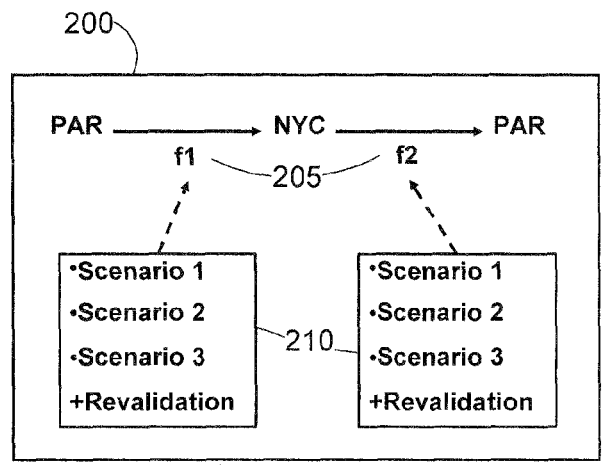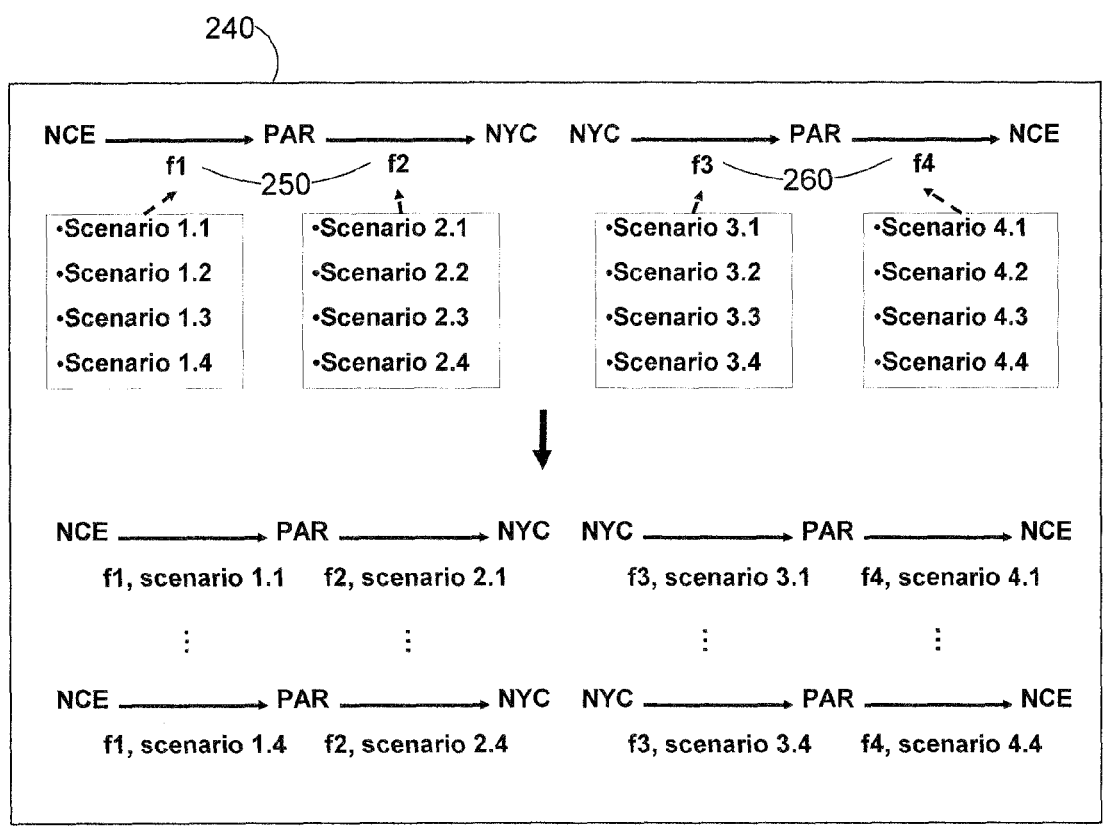
FIG. 2

| Origin | Departure Date | Departure Time | Destination | Arrival Date | Arrival Time | Re-Issue | Change | Route Change |
|---|---|---|---|---|---|---|---|---|
| PARIS | 10 JUNE 07 | 13:00 | NEW YORK | 10 JUNE 07 | 15:00 | NO | NO | NO |
| NEW YORK | 17 JUNE 07 | 19:00 | PARIS | 18 JUNE 07 | 7:00 | NO | NO | NO |

1310 / 1312 / 1314 / 1320

| Origin | Departure Date | Departure Time | Destination | Arrival Date | Arrival Time | Re-Issue | Change | Route Change |
|---|---|---|---|---|---|---|---|---|
| PARIS | 10 JUNE 07 | 13:00 | NEW YORK | 10 JUNE 07 | 15:00 | YES | NO | NO |
| NEW YORK | 17 JUNE 07 | 19:00 | PARIS | 18 JUNE 07 | 7:00 | YES | YES | YES |

Ticket Change Options & Restrictions:

XXXXXX XXX
XXXX XXXXX XXXXX
XXXX XXXXX XXXX XXXX XXX
XXXX XX XXXXXXXX XXX

XX
XXXX XXXX XXXXXXX
XXX XX

1370 / 1371 / 1330

| Origin | Departure Date | Departure Time | Destination | Arrival Date | Arrival Time | Re-Issue | Change | Route Change |
|---|---|---|---|---|---|---|---|---|
| PARIS | 10 JUNE 07 | 13:00 | NEW YORK | 10 JUNE 07 | 15:00 | YES | YES | NO |
| NEW YORK | | | | | 7:00 | YES | YES | NO | http://ticketchange.mytravelprovider.com

Ticket Change Options and Restrictions
(for Current Change Selection):

XXXXXX XXX
XXXX XXXXX XXXXX
XXXX XXXXX XXXX XXXX XXX
XXXX XX XXXXXXXX XXX

XX
XXXX XXXX XXXXXXX
XXX XX

XXXXXXXX
XXX XXX

Proceed http://www.mytravelprovider.com/

1360 / 1340

| Origin | | | | Arrival Time | Re-Issue | Change | Route Change |
|---|---|---|---|---|---|---|---|
| PARI | | | | 15:00 | YES | YES | YES |
| NEW Y | | | | 7:00 | YES | YES | YES |

AIRLINE TICKET CHANGE CONSTRAINER

CROSS REFERENCE TO RELATED APPLICATION

This application is a continuation-in-part of co-pending application Ser. No. 11/599,380 filed on 15 Nov. 2006.

FIELD OF THE INVENTION

The present invention relates to the field of travel ticketing and more specifically relates to the re-issuance of airline travel tickets.

BACKGROUND OF THE INVENTION

In the travel and airline industries a significant fraction of all tickets that are issued by airlines and other travel service providers are reissued at least once before travel on the ticket is completed. Changes that are requested by travelers include changing flights, dates and routes possibly to/from a new travel destination or origin. If revalidation of a ticket to accommodate a relatively simple change is often possible, reissuing a ticket is always a complex and time-consuming job that must be handled by a skilled travel agent.

Among the practices and tools in use by airlines and travel agencies to reissue a ticket some are said to be flight-driven. Their use implies that traveler has first to decide on all the characteristics of the new desired journey, i.e.: origin, destination, every via point (that may be different for outgoing and incoming parts of a return journey), flight number of each travel segment, dates and times of every flight. Given this information, a priced solution that must also fit the change conditions set by the first issued ticket can generally be returned. However, to achieve this, a large or very large number of travel possibilities must always be considered by the travel agent in an attempt to satisfy the end-user request. On top of being a time consuming operation this does not always provide the cheapest solution. The process lacks of consistency since the result is highly dependent on what travel agent considers for reissuing the ticket.

Ticket revalidation, which does not require the issuance of a new ticket, can apply only when minor changes such as flight changes or date changes are requested. Like above, revalidation process is flight-driven. It first checks if the change requested can actually be accommodated which does not prevent travel agent from having to try numerous possible routes and flights though. Finding the cheapest solution is not guaranteed and is highly dependent on travel agent skill and experience too. This latter must also make sure that the change conditions attached to the first issued ticket are actually observed.

Another category of tools for reissuing a ticket are said to be fare-driven. If those tools are devised to return the cheapest solution this is however obtained at the expense of ignoring, if not all, at least most of the change conditions which are published as standards by the airline industry. Indeed, those tools are generally limited to collect a change fee.

According to airline industry standards, the change conditions for a fare are published through rule scenarios. A rule scenario contains two kinds of constraints: the change restrictions and the pricing method to be used.

The change restrictions specify which changes are allowed regarding the new dates, origins, destinations, routes and flights. They include criterions such as: the fare category present in the original ticket; the passenger type; if the change is requested before or after passenger departure; if the change is requested before or after flight departure; the destination point; the change penalty.

The pricing method specifies how to price the new journey; in particular, which fares are to be used on which part of the journey, i.e.: fares valid when the first ticket was booked and fares valid when the change is requested. Examples of pricing methods currently specified are shown in table (100) of FIG. 1.

Airline standards assume that changes are carried out according to the process flow as shown in FIG. 1. Namely, the requested changes are checked against the change restrictions (110). According to the result of the checking, the pricing method to use is selected (120) allowing to build a priced change solution (130) that indeed meets the change conditions of airline standards (140).

Reissuing and, at a lesser extent, revalidating a ticket is thus no simple matter. It requires skilled travel agents and it is a time consuming, thus a costly activity for airlines and travel agencies.

On the other hand, with the ever-growing use and spreading of the Internet, most of the airline companies offer now the possibility of booking a trip and buy an airline ticket directly from their web servers without the need of visiting a travel agency. There are also a lot of specialized travel web sites, or online travel agencies, that give the opportunity to the end-users of those sites to buy travel tickets directly. Incidentally, in both cases, the ticket is most often 'de-materialized' (e-ticket) since no real ticket is ever issued and customer has just to show up to the airport airline counter with an ID e.g., a passport, to get its boarding pass. The amount of tickets issued through this channel is growing very rapidly. Irrespective of the fact tickets are 'de-materialized' or not they are equally susceptible to be changed while there is no actual possibility offered of reissuing a ticket from those web sites.

It is thus a broad object of the invention to overcome the difficulties, here above discussed, of reissuing and revalidating a travel ticket while meeting the change conditions imposed by airline industry standards through an automated process that does not have to rely on the expertise of a travel agent.

It is also an object of the invention that this automated process returns an exhaustive list of travel opportunities all meeting the requested changes and from which a traveler can pick a preferred solution.

It is a further object of the invention that returned travel opportunities always include the cheapest available opportunity.

Further objects, features and advantages of the present invention will become apparent to the ones skilled in the art upon examination of the following description in reference to the accompanying drawings. It is intended that any additional advantages be incorporated herein.

SUMMARY OF THE INVENTION

The invention described a ticket change constrainer which allows reissuing or revalidating an already issued airline ticket. It includes a ticket change domain reducer operable to reduce, i.e. to cut, an input search domain of change opportunities on the basis of change conditions set in the already issued ticket. It also includes a ticket change valuer operable to weigh the change opportunities of the reduced search domain and to return a reduced valued search domain of change opportunities. The weighing of the change opportunities is done on the basis of pricing method popularity scores updated in a ticket change memory by a ticket change watcher agent from actual change transactions handled by the system.

The change conditions include standard pricing methods of the airline industry. The input search domain of change opportunities is produced by a conventional fare-driven search engine on the basis of a ticket change request issued by an end-user of the system. The reduced valued search domain of change opportunities returned by the ticket change constrainer always includes a lowest fare opportunity compatible with the change conditions set in the already issued ticket.

The invention further describes an automated system and a method for checking an already issued airline ticket prior to having a requester submitting a change request of the already issued airline ticket. The system comprises a ticket data retriever means for retrieving, with a ticket reference provided by the requester, the already issued airline ticket from a ticket database. Then, an issued fare rule finder means retrieves, from a rule database, one or more rule scenarios applying to the already issued airline ticket and governing what changes are permitted. After which a decision module means combines the one or more rule scenarios into a set of permitted options and restrictions and delivers them to the requester.

BRIEF DESCRIPTION OF THE DRAWINGS

FIG. 1 illustrates state-of-the-art re-issuance of an airline ticket.

FIG. 2 further discusses the complexity of having to reissue or revalidate an already issued ticket.

FIG. 13 illustrates through a few examples how the change options and restrictions are presented to the requester of the ticket change.

DETAILED DESCRIPTION

Figure 3:
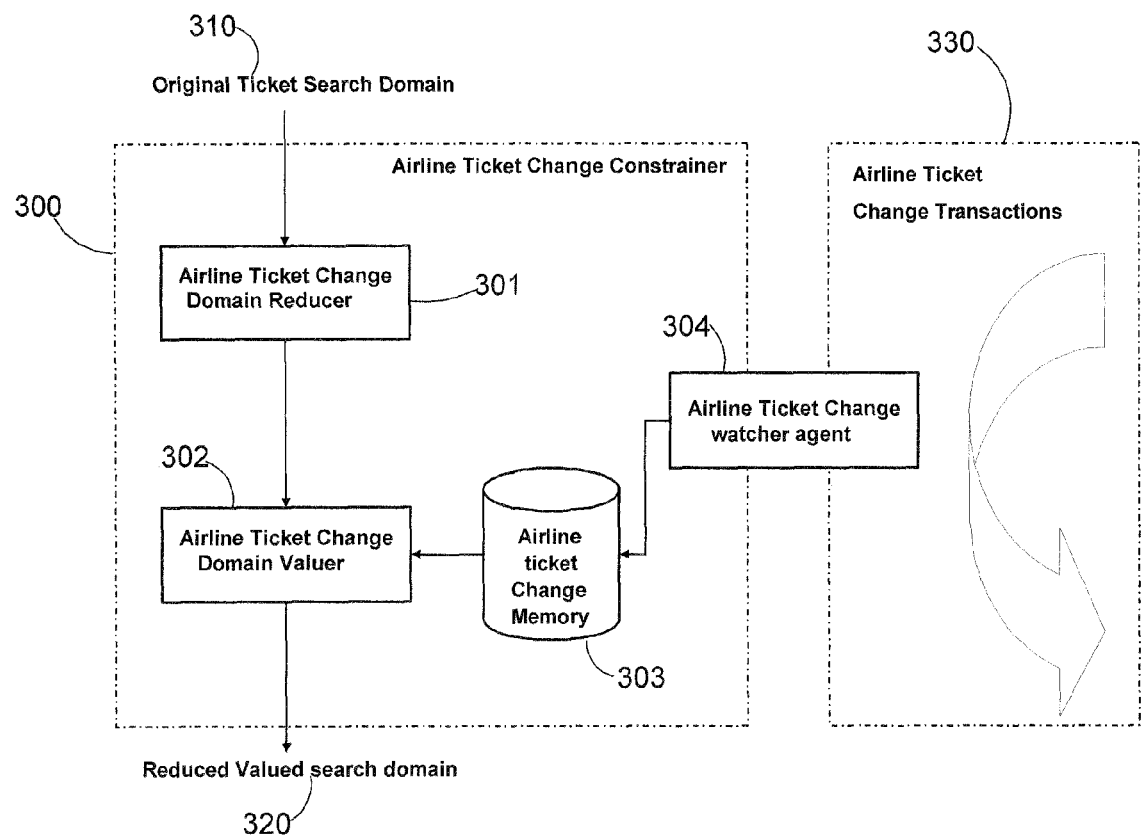
FIG. 3 depicts an airline ticket change constrainer according to the invention that permits a drastic reduction of the change opportunities to be retained when re-issuing or revalidating an airline ticket

The following detailed description of the invention refers to the accompanying drawings. While the description includes exemplary embodiments, other embodiments are possible, and changes may be made to the embodiments described without departing from the spirit and scope of the invention.

FIG. 2 further discusses the complexity of having to reissue or revalidate an already issued ticket. To be fully compliant with the airline industry standards a fare-driven ticket changer according to the invention must be able to handle fare data versions corresponding to fares valid either at issue or reissue time. Therefore, the fare data volume to be handled is significantly bigger than with a standard fare-driven tool product. Moreover, the fare-driven ticket changer must also handle every change condition of the fares priced in the original ticket to actually guarantee the finding of the cheapest solution.

For example, FIG. 2 shows first an original ticket (200) of a very simple round trip between two cities referred to by their IATA (International Air Transport Association) codes as PAR and NYC and priced with only two fares f1 and f2 (205). If we assume that each fare of the original ticket has just three associated reissue policy scenarios (many more fares and scenarios could have to be considered in practice) and one revalidation scenario (210) there are already 10 possible combinations to consider in this straightforward example; i.e.: the 3×3 reissue combinations plus the revalidation one. Also, the number of fares must be doubled as compared to a standard fare driven product since the fares valid when the original ticket was priced and the fares valid at the date of the ticket change request have both to be considered. Hence, in this case, the data volume is actually 2×10, i.e.: 20 times bigger than for a standard fare driven product. Moreover, all these scenarios must be combined together to find the cheapest solution. Considering a fare couple f1-f2 used to price the new journey, each possible scenario of f1 fare must also be combined with each possible scenario of f2 fare. In the example of FIG. 2 there are 4 scenarios per fare, which leads to 16 possible combinations.

Therefore, for a very standard request (240) with two outbound fare components (250), two inbound fare components (260), and an average of four scenarios per fare, the number of scenario combinations is $4^4=256$ times bigger as compared to a standard fare driven request. On top of this, for the reason mentioned above, the number of fares is doubled on each fare component. This leads to have $2^4=16$ times more fare combinations to consider. Finally, the number of pricing solution combinations is thus actually 16×256=4496 times bigger as compared to a standard fare driven request.

Thus, the volume of data to consider is huge as compared to the one a standard fare-driven search tool has to manipulate. Moreover, change scenarios do not impact the fare amount but the validity of the solution being considered. As a consequence, the data cannot be easily discriminated: the fare-driven search tool has to explore the whole solution domain increasing accordingly the CPU (Central Processing Unit) time necessary to retrieve a viable solution. Considering that a conventional fare-driven product needs 1 second of CPU time to find a fare; a fare-driven ticket changer that would have to go through all the combinations, as quantified above, would require 4496 seconds; which does not make sense in practice.

FIG. 3 describes the "airline ticket change constrainer" (300), the component of the invention that permits a drastic reduction in the change possibilities to be retained from the original ticket. The airline ticket change constrainer is aimed at reducing, i.e., cutting, the search domain on the basis of the change conditions attached to the original ticket. Hence, it allows reissuing or revalidating a ticket without having to consider every piece of the huge amount of potentially available input data:

it takes advantage of the very restrictive constraints set by the change restrictions of the original ticket allowing to cut invalid parts of the search domain;

the remaining potential parts of the search domain are then valued (i.e., weighted, as it is further discussed in the following description) in order to discriminate among solutions that would be equivalent in term of fare amounts. Hence, if two potential solutions return the same fare amount, the one with the highest weight value is explored first.

The airline ticket change constrainer can be used with various levels of constraints set for the input domain to search:
- with no constraint on the search domain;
- with fare constraints;
- with route constraints;
- with flight constraints;
- with a combination of these constraints;

In input (310), the airline ticket change constrainer thus requires:
- an original ticket being reissued in order to retrieve the change conditions;
- the description of the current search domain.

The pricing method becomes a part of the solution domain which is organized with seven degrees of freedom:
- new possible dates,
- new origin,
- new destination,
- new routes,
- new flights,
- new possible fares,
- and pricing methods.

Therefore, the input of the airline ticket change constrainer, which makes use of graphs as further discussed in the description of the invention, is finally:
- the original ticket;
- new departure dates range;
- new origins;
- new destinations;
- new graph of routes and dates;
- new flights graph for a given combination of route and date;
- new pricing method graph;
- new fares graph.

As far as the output (320) of the airline ticket change constrainer is concerned it consists in:
- a description of the new solutions domain after reduction (new constraints have been activated thanks to the constraints got in input);
- a valuation or weighing of the remaining potential solution regarding their potential success.

So as to get:
- valued new departure dates range;
- valued new origins;
- valued new destinations;
- valued new (date, route) graph;
- valued new flights graph;
- valued new pricing method graph;
- valued new fares graph.

To achieve this, the airline ticket change constrainer (300) is comprised of following four main components:

An airline ticket change domain reducer (301) which is aimed at reducing the search domain on the basis of the change conditions specified on the original ticket. This component is further described in FIG. 4.

An airline ticket change domain valuer (302) aimed at attributing a weight to:
- each date of the date range; and, for the graphs returned by the change domain reducer (301):
- each arc of the (date, route) graph;
- each arc of the pricing method graph;
- each arc of the fare graph;
- each arc of the flight graph.

The valuation is based on the pricing popularity score as computed by the airline ticket change watcher agent (304) shown below, and stored in the airline ticket change memory: (303), also shown hereafter. As soon as a solution is linked to a unique pricing method, it inherits the corresponding pricing method score from it. Purpose of the valuation is to discriminate between potential solutions sharing same fare amounts but with different attached change restrictions.

An airline ticket change memory (303) structured to obtain a synthetic view of the information stream related to the change transactions which are handled by the system. It is further described in FIG. 5. Purpose of the memory is to link a popularity score, also discussed hereafter, to a given pricing method in a given context. The context is determined by a set of key parameter values including a:
- carrier constraint;
- flight departure date constraint;
- passenger departure date constraint;
- route constraint;
- fare construction constraint.

Figure 6:
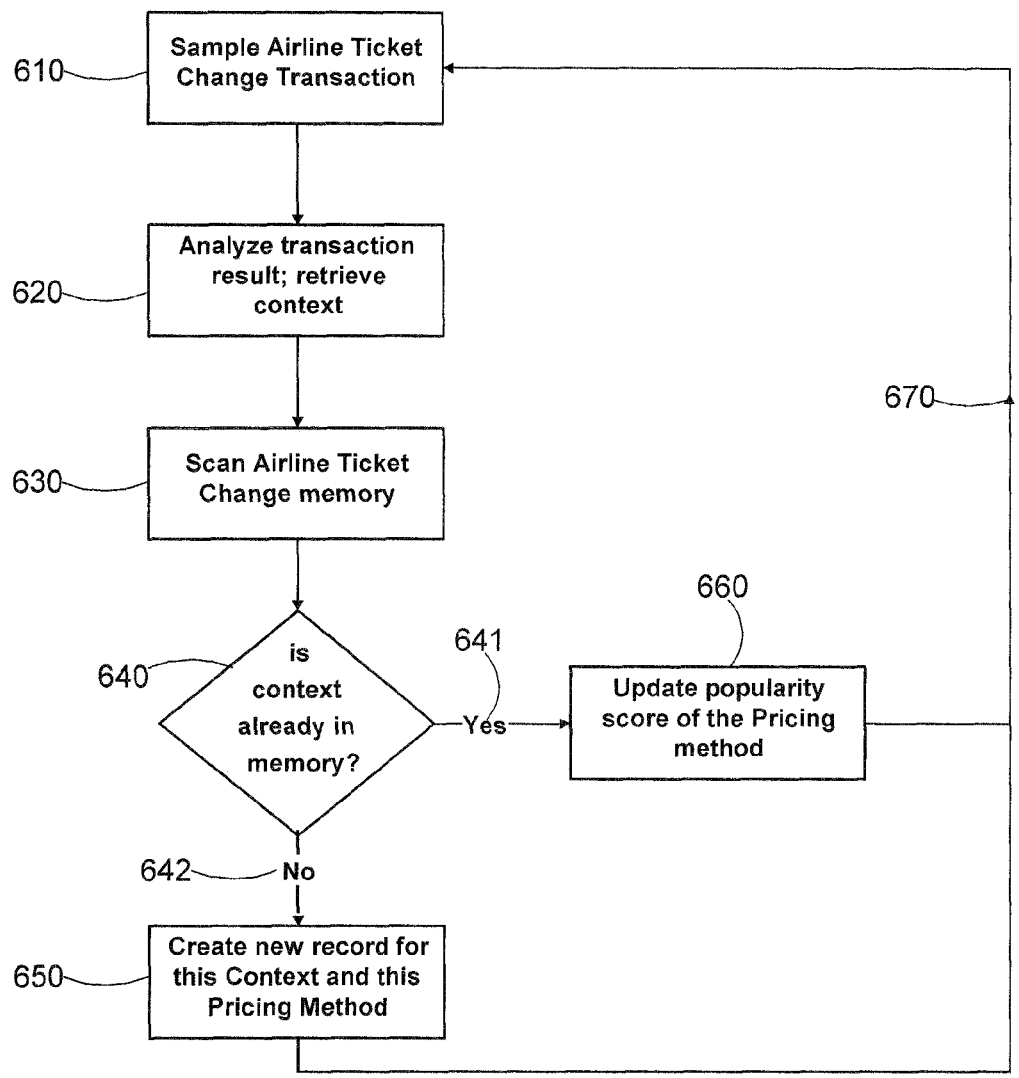
FIG. 6 is a flow chart of the operations performed by the airline ticket change watch agent (304), yet another component of the airline ticket change constrainer.

An airline ticket change watch agent (304) further described in FIG. 6. Its role is to watch the airline ticket change transactions (330) in order to detect which pricing method is used in a given context. When a pricing method is used its popularity score, in the given context, is increased. Popularity score is updated in the here above airline ticket change memory where it is saved. The airline ticket change watch agent runs asynchronously on a subset of the transactions.

Figure 4:
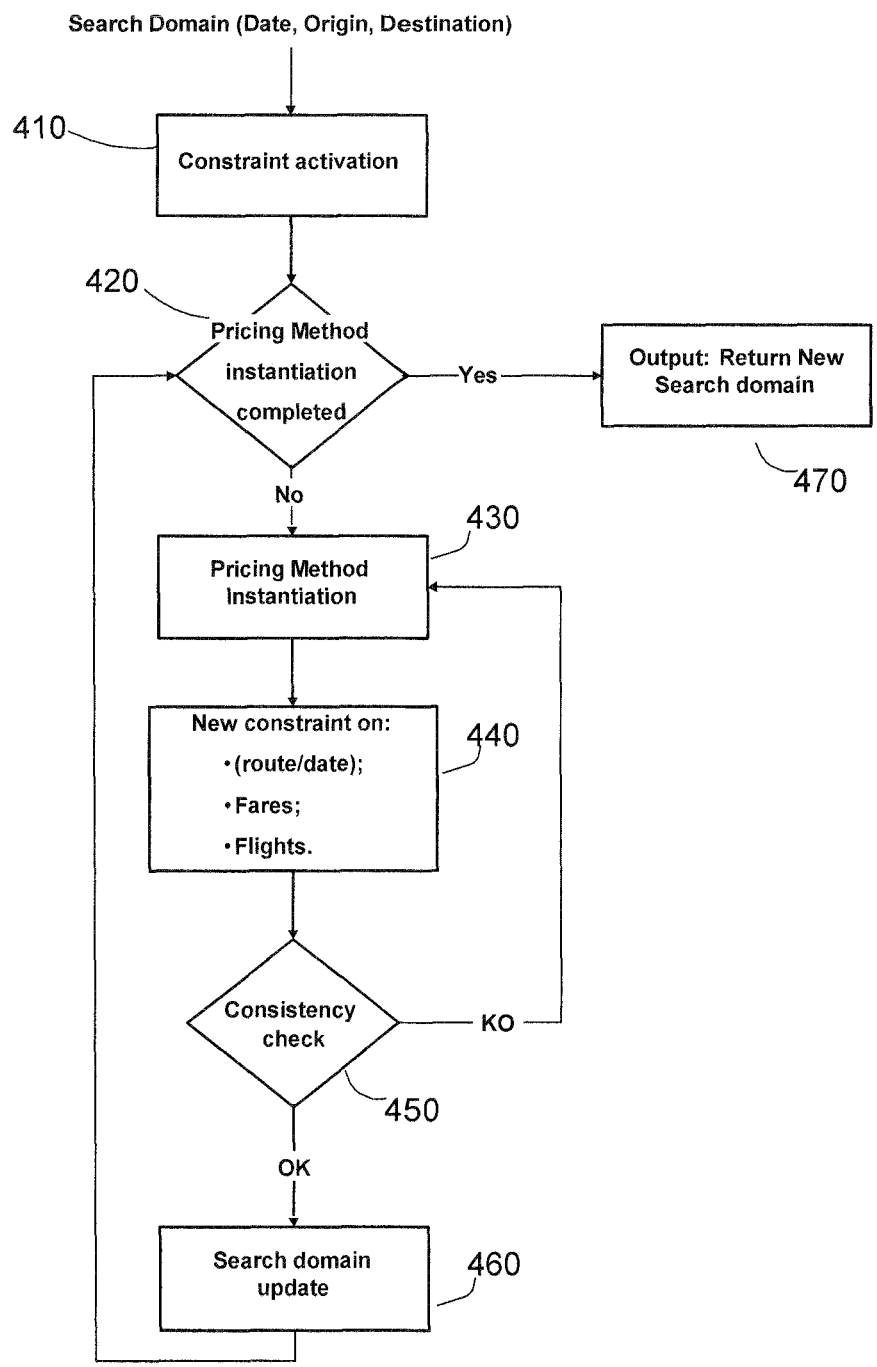
FIG. 4 is a flow chart of the operations performed by the airline ticket change domain reducer, a component of the airline ticket change constrainer.

FIG. 4 is a flow chart of the operations performed by the airline ticket change domain reducer (301), part of the change constrainer (300) shown in FIG. 3, to cut the search domain.

On the basis of the original ticket and of the changes requested all constraints are activated (410) which allows looping (420) through all relevant pricing methods. Each relevant pricing method is in turn instantiated (430) so that new constraints on route/dates, fares and flights can be set (440). After consistency of set constraints have been checked (450) the search domain can actually be updated (460), i.e.: reduced.

Once pricing methods have all been tried the airline ticket change domain reducer can return the new (reduced) search domain (470).

Figure 5:
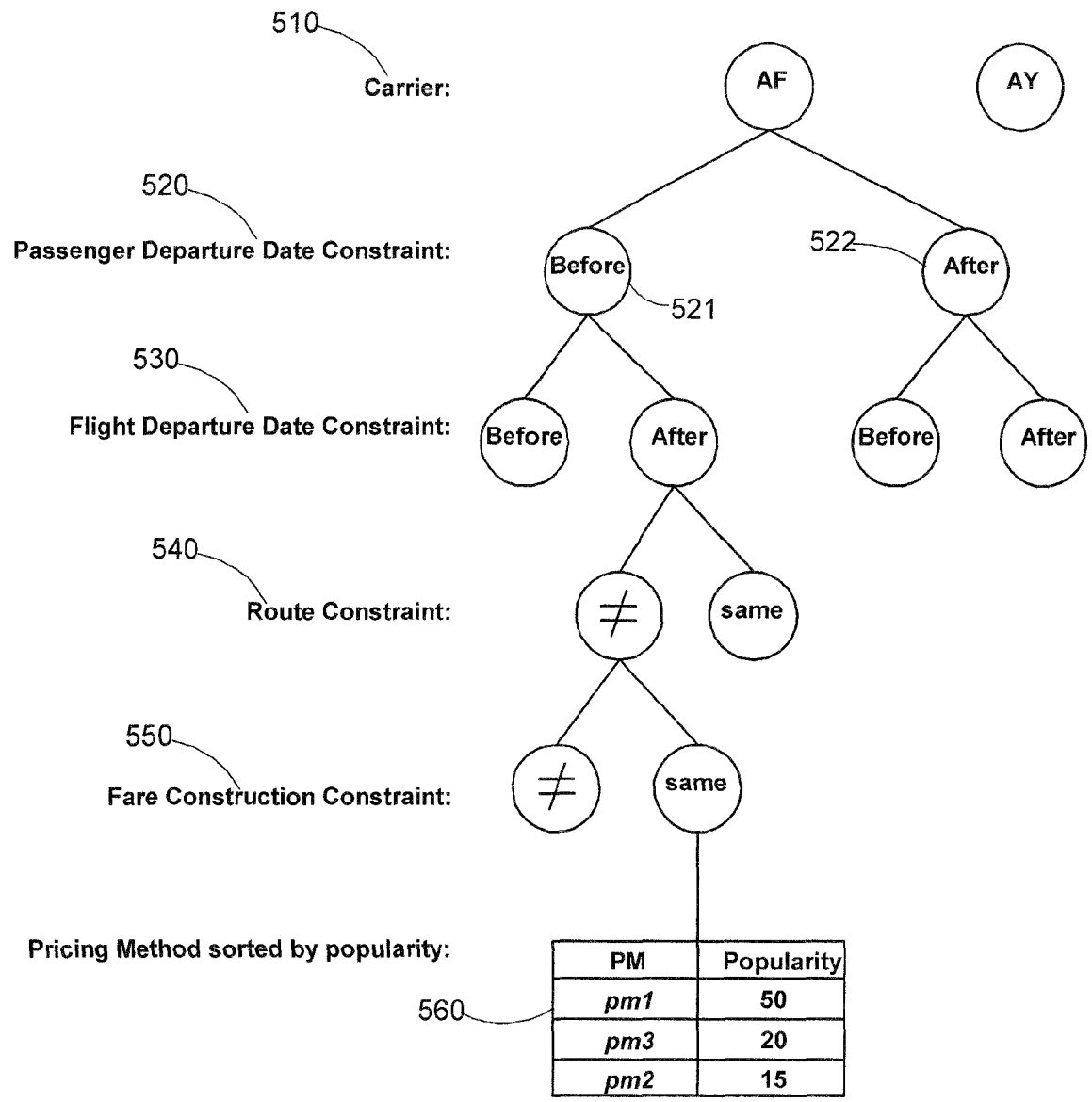
FIG. 5 depicts the structure of the airline ticket change memory, another component of the airline ticket change constrainer.

FIG. 5 depicts the structure of the airline ticket change memory (303), a component of the change constrainer (300) shown in FIG. 3

The memory is organized under the form of trees where roots (510) are the carriers, i.e., the airline companies. As mentioned in FIG. 3, purpose of the memory is to establish a link between a popularity score and a given pricing method, here shown under the form of table (560), in a given context. The context is determined by the constraints that were set to reduce the search domain. On top of the carriers that are at roots of the trees, the other constraints deal with the passenger departure date (520). This constraint consists in checking if the passenger departure date is before (521) or after (522) the date at which change is requested. In a similar way, the third constraint (530) deals with the flight departure date. Also, route (540) and fare construction (550) constraints are considered for the context, checking if they are the same or different.

FIG. 6 is a flow chart of the operations performed by the airline ticket change watch agent (304), another component of the change constrainer (300) shown in FIG. 3, aimed at watching the airline ticket change transactions.

The watch agent works on samples (610) of the change transactions actually handled by a system making use of the invention. Samples are, for example, randomly selected. The following step (620) analyzes the transaction to retrieve its context. Then, the airline ticket change memory (303) discussed in FIG. 3 and in FIG. 6 is scanned (630) to check (640) if the current context is already in it or not. If not (642) a new record for the current context and pricing method must be created (650). If already present in memory (641) the popularity score of the pricing method is updated (660). In both cases, flow chart loops (670), thus returns to first step (610) from where a new transaction sample can be analyzed.

Figure 7:
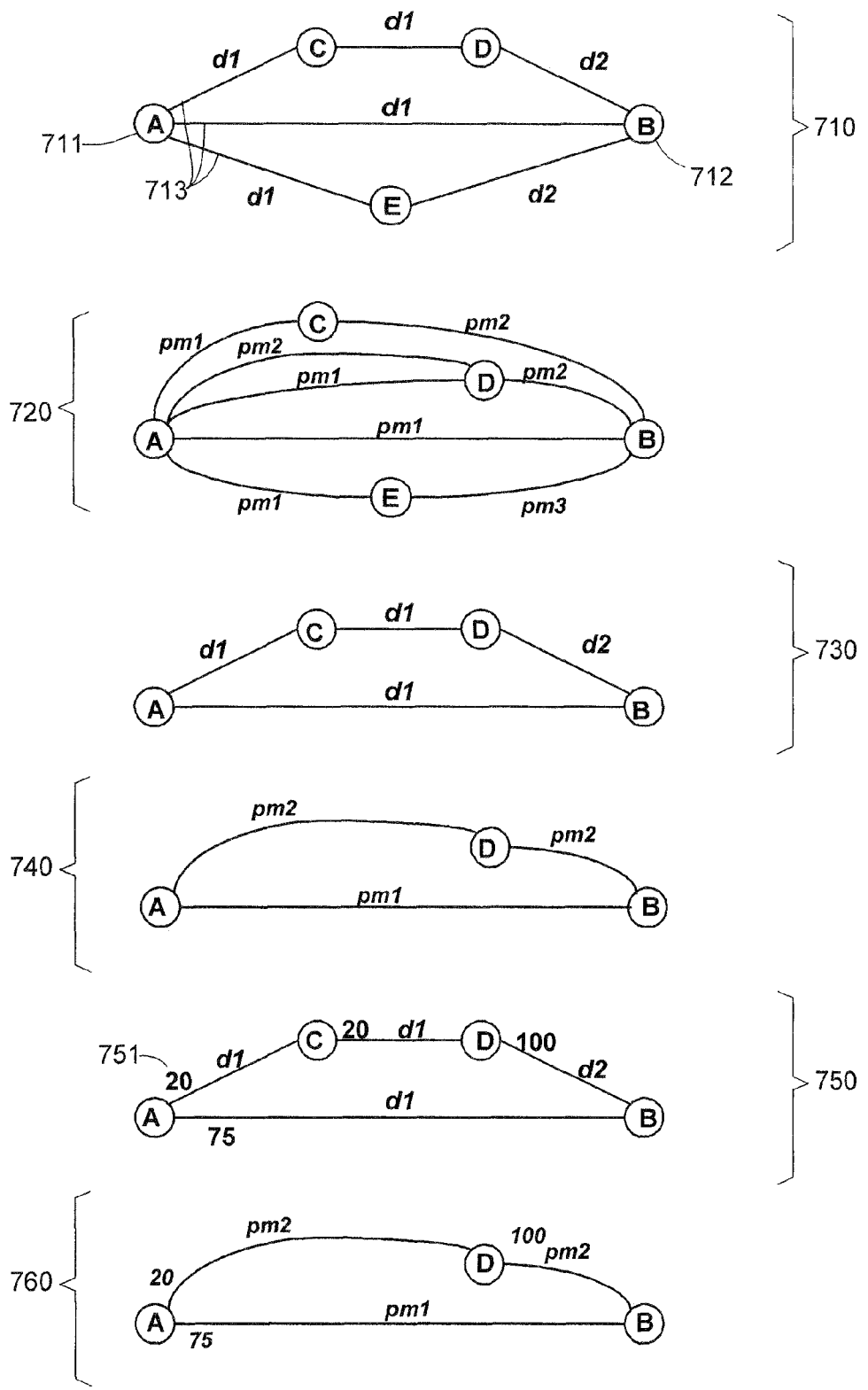
FIG. 7 shows through a particular example how the search domain of change opportunities is reduced.

FIG. 7 shows through a particular example how the search domain of change opportunities is reduced.

The example of this figure considers a change request for a one-way trip from city A to city B for a given departure date (d1). First, a (date/route) graph (710) is produced by a standard fare-driven product to get all possibilities of flying from city A (711) to city B (712), departing on day d1 (713). The graph nodes are the cities and graph arcs carry the dates. This includes the options of having to make one or two stopovers (cities C, D and E) and arrive the day after (d2) A pricing method graph is also produced (720) of all possible pricing methods (pm) that can possibly considered for flying between A and B.

Then, the air ticket change constrainer is able to reduce significantly the search domain by taken into consideration the change conditions attached to the original ticket to be reissued or revalidated. Change conditions that apply in this particular example are:

a stopover through E is not allowed
pm1 cannot combined with pm3
pm1 can only apply on a through fare (A to B)

In which case the (date/route) graph (710) is reduced as shown (730) and pricing method graph (720) can be much simplified (740), thus drastically reducing the search domain. In this example, the only pricing method considered between A and D is pm2. Following definition of pm2 (100) as shown in FIG. 1, this means it is not worth loading today fares on the considered market. On the A-D market, the fares domain is reduced by a factor of two.

Moreover, each remaining route of the graphs is valued (i.e., weighed) as shown (750, 760) on the basis of its popularity score previously discussed, e.g.: (751). Then, the weighing of the different route of the graphs allows discriminating among two routes corresponding to the same fare amount. In this example, the route A-D-B weighs 20 (minimum weight value on the route), the route A-B weighs 75; the airline ticket change constrainer indicates that the direct route A-B is the most successful. This information can be then used to drive the domain exploration of the fare-driven search engine.

Figure 8:
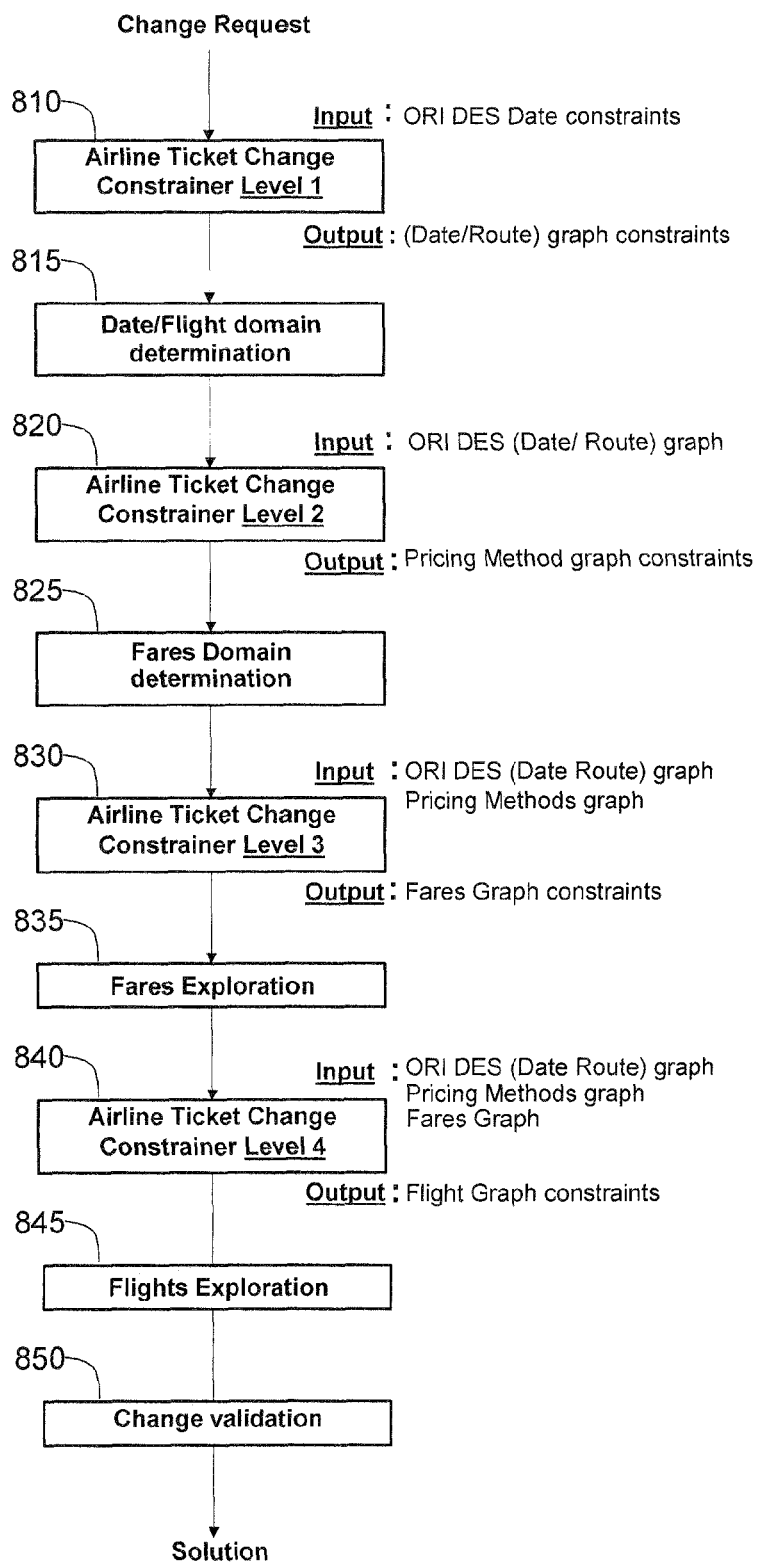
FIG. 8 shows how the airline ticket change constrainer is used to implement a fare-driven online ticket changer.

FIG. 8 shows how the airline ticket change constrainer described in previous figures is used to implement a fare-driven online ticket changer which does not require the expertise of a travel agent when a casual end-user of such a site wants to change an airline ticket that has already been issued. This process applies whichever ticket must be reissued or revalidated. The fact that ticket is re-issued or just revalidated is however made transparent to the end-user. Also, since this latter is not assumed to have in any way the expertise of a travel agent, all change conditions specified by the airline standards are automatically adhered to as a result of the use of the change constrainer according to the invention.

As shown in FIG. 8 the airline ticket change constrainer is called each time a new level of constraints is considered. At level 1 (810), on the basis of the date constraints obtained from the change request a (date/route) graph of constraints, of kind shown in previous figure, is produced so that a date/flight search domain can be determined (815). Then, at level 2 (820), on the basis of the here above graph used as input, the airline ticket change constrainer produces a pricing methods graph of constraints which allows determining a domain of fares (825). At level 3 (830), the two above graphs serve in turn as input to the airline ticket change constrainer to get another graph of constraints on fares so that an exploration of selected fares (835) is performed. Finally, a further call at level 4 (840), using all previous graphs as input, produces a flight graph of constraints allowing an exploration of selected flights (845) that constitute the set of solutions proposed to the end-user once they have been validated (850).

Figure 9:
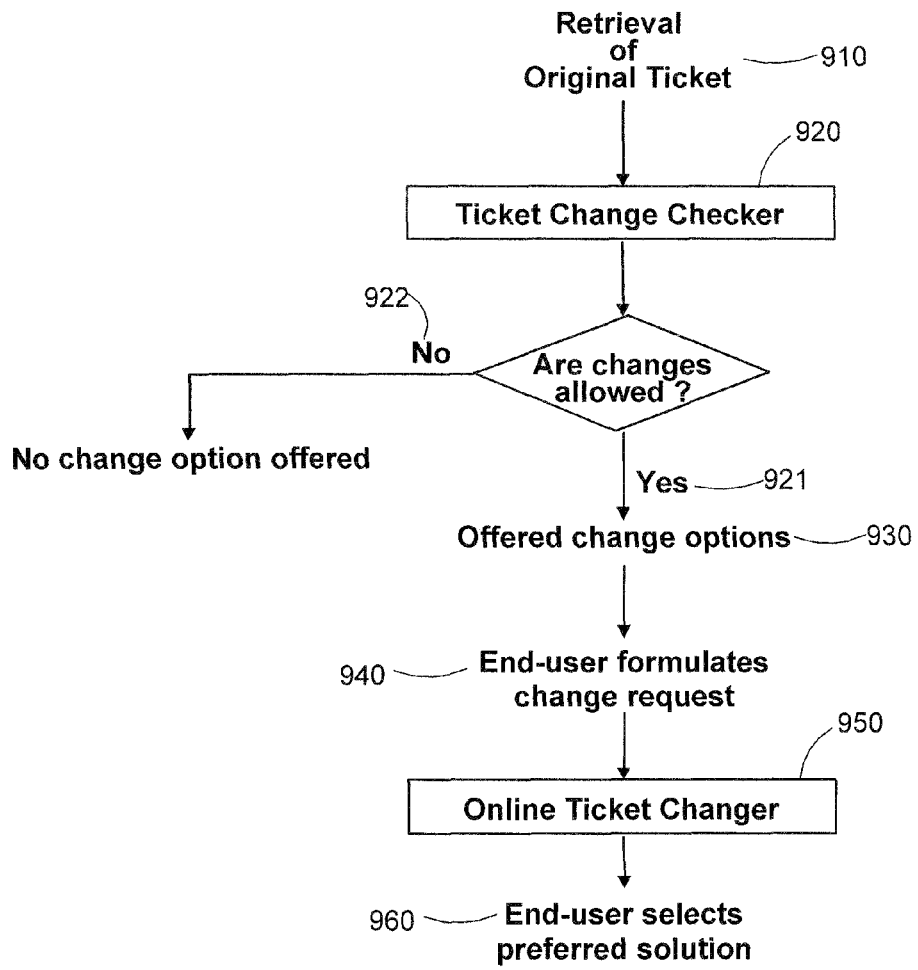
FIG. 9 depicts the overall processing flow of a ticket change request according to the invention.

FIG. 9 depicts the overall processing flow of a ticket change request according to the invention. The request leads to reissue or to revalidate a ticket that has been previously issued without requiring the expertise of a travel agent, thus can be conducted by the casual end-user of an online travel site.

Once the original ticket has been retrieved (910) a ticket change checker (920) is first called in order to verify that changes are actually allowed. If not (922), no change option is offered thus making clear immediately to the end-user that reissuing or revalidating of the original ticket is not permitted.

If changes are allowed (921), change options are offered to the end-user (930). From them, the end-user can then formulate a change request which is used as input by the online ticket changer (950) described in FIG. 8.

A set of solutions that adhere to the airline industry standards is then proposed to the end-user who is just left with the choice of picking up a particular solution (960). This process is also automated and further described in FIG. 11 and followings.

Figure 10:
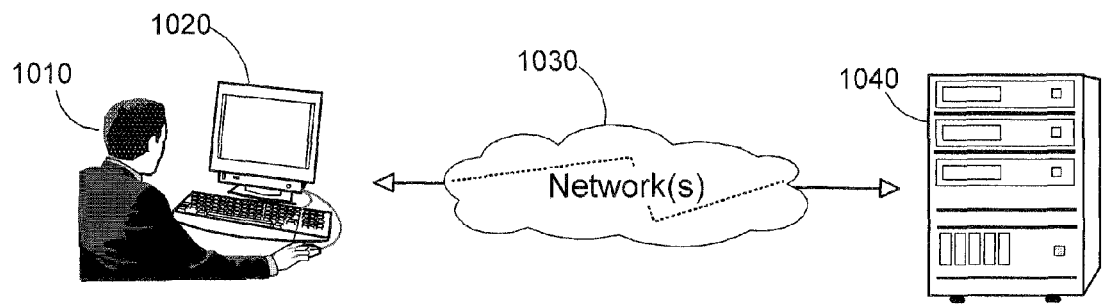
FIG. 10 described the environment in which the invention is carried out.

FIG. 10 described the environment in which the invention is carried out. An online ticket changer according to the invention is implemented on a computer-based system (1040) of the kind used by travel service providers and airlines companies to set up their travel sites so that an end-user (1010) can remotely access it to perform any travel related transaction like booking a trip or, using the online ticket changer of the invention, changing an already issued ticket.

Computer-based system (1040) can be anything from a stand-alone computer to a cluster of redundant servers including large or very large computers referred to as main-frames capable of operating in a 24 hour-a-day, 7 day-a-week mode.

End user (1010) is, e.g., an individual using a personal computer (1020) equipped with any form of navigation tool capable of accessing a travel site hosted on a computer-based system (1040) through a network or a combination of private and/or public networks (1030) including the Internet. The end-user is as well a travel agent in a travel agency remotely using the computer resources of its service provider.

Figure 11:
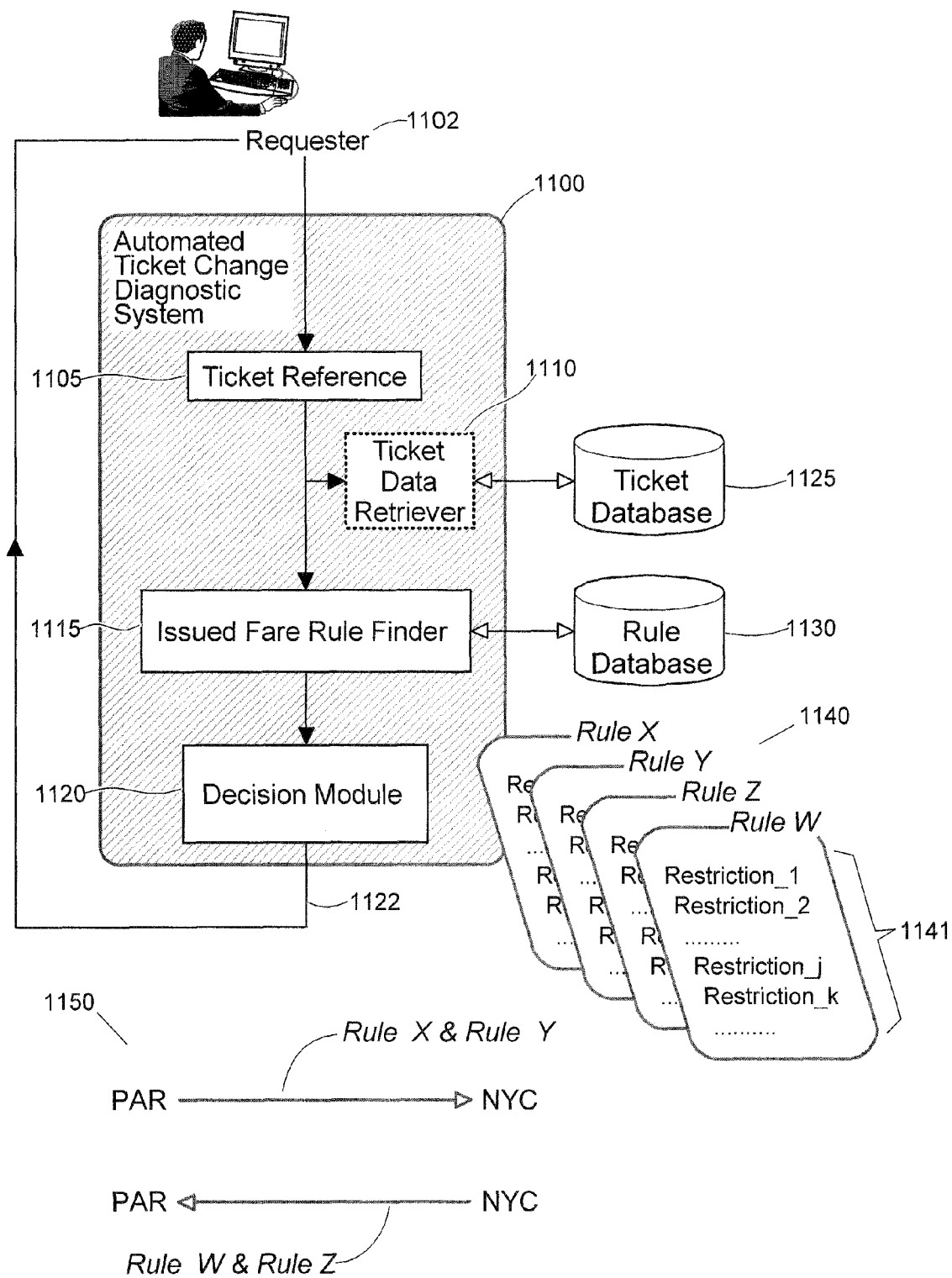
FIG. 11 describes a ticket change diagnostic system aimed at checking an already issued ticket.

FIG. 11 describes a ticket change diagnostic system aimed at checking an already issued ticket in order to determine automatically if, and under which particular conditions, the ticket can be revalidated or reissued. The diagnostic system described in FIG. 11 thus implements the ticket change checker function (920) shown in FIG. 9. It allows carrying out an automatic checking of the ticket to be changed prior to actually requesting the changes so that only informed change requests can be submitted to the online ticket changer (950).

The automated ticket change diagnostic system (1100) is made of three components:

A ticket data retriever (1110).

The ticket data retriever is, optionally, an embedded component or a component external to the system part of the standard tools and software applications that any travel service provider is using to retrieve the tickets it has already issued from a corresponding database (1125). Whichever retriever is embedded or external it uses the reference of the ticket to be changed (1105), provided by the requester of the change (1102), to retrieve all the information regarding the issued ticket.

An issued fare rule finder (1115).

Based on the ticket reference (1105) and on the information retrieved from the ticket database (1125) the issued fare rule finder is able to retrieve the one or more rule scenarios governing the first issued ticket as already discussed in the background section. Rules are retrieved from a corresponding database of rules (1130) directly held and maintained by the travel service provider or made remotely accessible through its computing, communications and networking resources from publishers of airline standards. Each rule contains one more restrictions allowing to determine the possible ticket change options.

A decision module (1120).

Analyzing and combining all the retrieved rules the decision module makes the final decision on what change restrictions attached to the already issued ticket actually apply. Once processing of the rules is complete the change restrictions are forwarded (1122) to the ticket change requester. As shown in FIG. 10 requester (1010) is for example an end-user having accessed, from a personal computer, to the travel web site operating the automated ticket change diagnostic system; or a travel agent, on behalf of a traveler, through the computing and communications resources of a travel agency. Change restrictions are intended to be interpreted by the end-user or the travel agent in order to formulate a ticket change request in line with the restrictions attached to the issued ticket.

In general, several fare rules are attached to the already issued ticket. They are all driving the reissue process. A limited amount of data is needed in input of the issued fare rule finder to retrieve the associated rules among thousands of published rules held by the rule database (1130). Following is an example of what needs to be provided:

Origin and destination of each portion of the trip and all via points

Departure and arrival times and dates, flights numbers, booking class

Price of the already issued ticket

First ticketing date.

As explained above, this information is obtained from the ticket reference (1105) provided by the requester of the change and of the corresponding data retrieved from the ticket database (1125).

A simple example of an already issued ticket for a round-trip between Paris (IATA code PAR) and New York City (IATA code NYC) is also shown (1150). In this example four rules have been retrieved by the rule finder (1115). These are rules referred to as X, Y, Z and W (1140). The two rules X and Y are attached to the outgoing portion of the trip, i.e.: PAR-NYC while the other two rules W and Z are attached to the incoming portion NYC-PAR. Each rule may contain a large number of indexed restrictions (1141) which are indicative of the manner that reissue or revalidation process should be performed.

Based on the first ticketing date, for each change restriction, the decision module determines the least restrictive one among the set of rules governing the already issued ticket. For each indexed restriction, i.e.: Restriction (i), the resulting restriction is the union of the all corresponding rule restrictions: Result of Restriction$_{(i)}$=U{Restriction$_{(i)}$}.

This operation is performed for each change restriction so that a set of informative change restrictions can be returned to the requester, i.e., to the end-user of the website or to the travel agent:

Final result sent to the requester={Result of Restriction$_{(1)}$, ... Result of Restriction$_{(2)}$, Result of Restriction$_{(i)}$}

Additionally, the automated ticket change diagnostic system (1100) determines if any penalty charge has to apply.

The change restrictions returned to the requester include information on what is permitted or not, such as:

is ticket reissue allowed or forbidden?

are ticket changes permitted or not?

are route changes permitted, not permitted or restricted?

etc.

Therefore, prior to actually requesting a ticket change, the requester is well informed of the possible change options. Hence, revalidation or reissuing, if indeed permitted, can be conducted in a more efficient way and delivery of changes expedited by an automated process that does not require the skill of an experienced travel agent.

Figure 12:
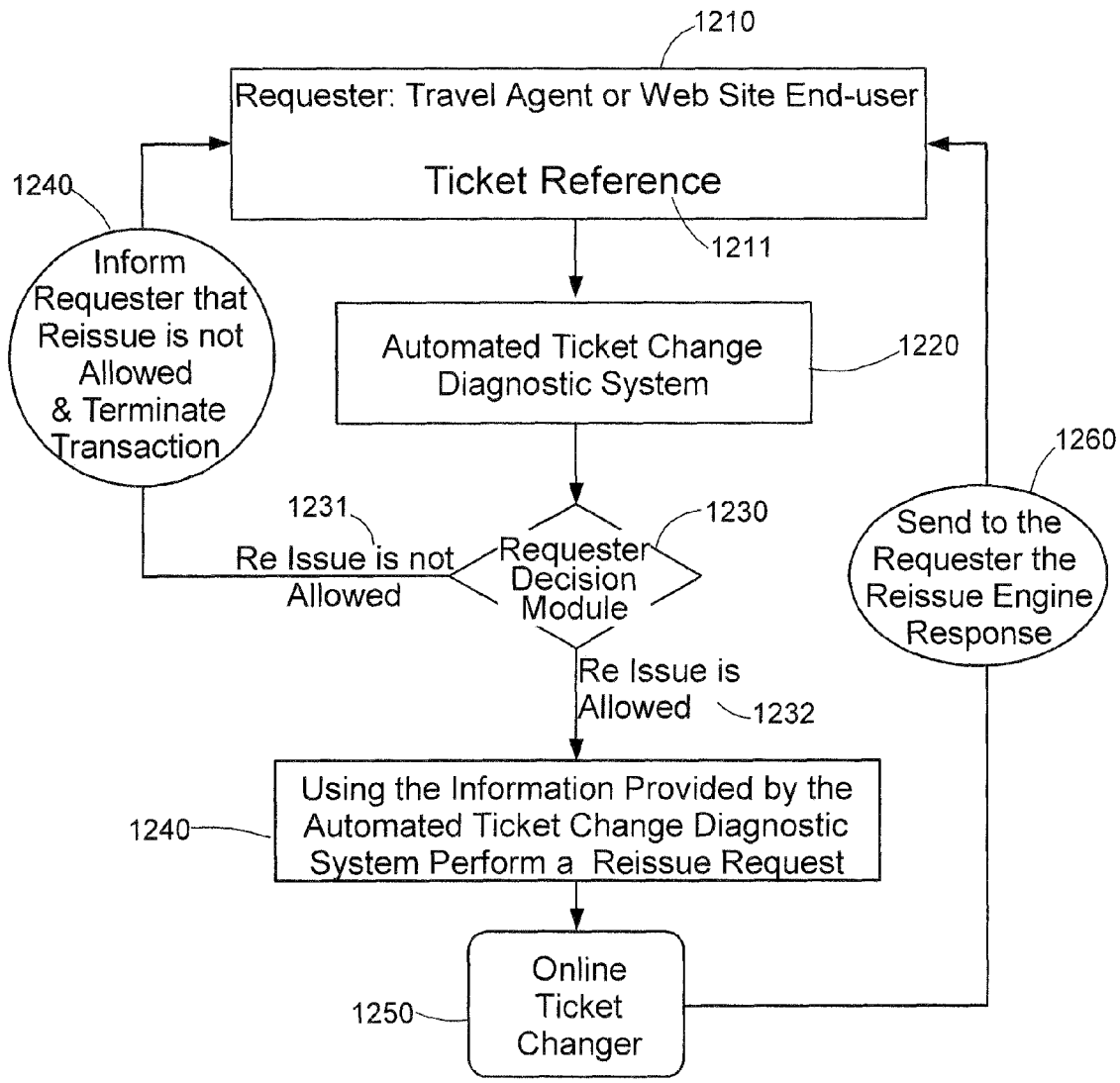
FIG. 12 describes the steps of the method for checking an already issued ticket prior to actually requesting a change.

FIG. 12 describes the steps of the method for checking an already issued ticket prior to actually requesting a change.

Process is initiated by a requester that wants to change an already issued ticket (1210). Requester is thus expected to provide the reference of the ticket to be changed (1211). Then, the automated ticket change diagnostic system is invoked (1220) to determine, as explained in FIG. 11, what change restrictions actually apply to the reference ticket. The set of change restrictions are forwarded to the requester. Once requester has received them he/she can invoke a website decision module to interpret the change restrictions (1230). If reissue or revalidation of the ticket is not at all permitted (1231) requester is immediately informed that no changes are possible. This also terminates the transaction thus prevent requester from uselessly attempting numerous ticket changes that would all fail.

If reissue or revalidation of the ticket is indeed allowed (1232) the website decision module (1230) helps requester making a decision among the permitted change options. An example of such a website decision module is described hereafter in FIG. 13. Then, an informed reissue request can be submitted (1240) to the online ticket changer (1250) with a good probability of completing successfully since all rules governing the reissue or revalidation have been first checked. The online ticket changer previously described processes the request and eventually forward the result to the requester (1260).

FIG. 13 illustrates through a few examples how the change options and restrictions are presented to the requester of the ticket change. In general this takes the form of a web page displayed on the screen of the personal computer of an end-user having accessed a travel site to request a ticket change. It is as well what is displayed on the monitor of a travel agent connected to the computing resources of a travel agency and requesting a ticket change on behalf of a customer.

Through the same simple example of a round-trip between PARIS and NEW YORK CITY used in FIG. 11 exemplary cases are shown of how restrictions, forwarded by the automated ticket change diagnostic system, are presented by the online travel application to the end-user or travel agent requesting a ticket change.

In response to the ticket change request a window is displayed (1310) by display means (even if other kind of notification means notably audio means can be implemented in combination or in replacement) that recalls the main characteristics of the round-trip to be changed, i.e.: origin, destination, dates, etc (1312) for the outbound and inbound segments of the trip. The change options are displayed on the right (1320) including in this example the possibilities of reissuing completely the ticket, changing it (i.e.: revalidating some of the flights, dates and times) and changing route.

In the case where no change is permitted all options are obviously negated (1314) and no further processing is possible. To the contrary, when some of the change options are positively marked, e.g.: (1330, 1340, 1350), the displayed window is an interactive page where links to other web pages allow to further process the change request. Hence, positive marks are all, e.g., hyperlinks to other pages of the web software application end-user or travel agent are currently interacting with to change an already issued ticket. Intermediate web pages are thus presented to the requester of the ticket change possibly showing all options and restrictions that go with the selected change option.

Alternatively, positive marks, when clicked, may trigger the opening of a popup window (1360) on top of the currently displayed page carrying details of the offered options and associated restrictions. Also, a clickable and rollover link to a popup window (1370) can be used which displays as soon as cursor (1371) is move over a positive mark.

Whichever method is employed to communicate to the requester the possible change options and restrictions that have been determined by the automated ticket change diagnostic system of the invention an informed choice can eventually be done by this latter. When requester has gathered enough information on the possible changes he/she may exercise a choice and can decide to proceed with a particular change option. In general this is done by activating a hyperlink (1371) to another page. In which case the online ticket changer previously discussed is called so that a ticket change solution is returned to the requester that best fit his/her expectation within the field of the possible offered change options.

What is claimed is:

1. A system comprising:
an online ticket changer configured to deliver travel change solutions;
a ticket database including an already-issued airline ticket;
a fare rule database including a plurality of rule scenarios governing permitted changes to the already-issued airline ticket; and
an automated system including a computer configured to receive a ticket reference from a requester, to retrieve the already-issued airline ticket from the ticket database based upon the ticket reference, to retrieve, from the rule database, one or more rule scenarios applicable to the already issued-airline ticket, and to combine the one or more rule scenarios into a plurality of change options and restrictions to be delivered to the requester and a positive indication of allowability or a negative indication of allowability for each of the change options and restrictions, at least one of the change options and restrictions selected from the group consisting of ticket reissue ticket change, and route change,
wherein the computer further includes a display configured to display information within a first web page to the requester about the change options and restrictions and about the positive indication of allowability or the negative indication of allowability for each of the change options and restrictions, and the first web page is configured to present the positive indication or the negative indication for each of the change options and restrictions as a hyperlink to a second web page or as a link to a popup window.

2. The automated system of claim 1 wherein the one or more rule scenarios are combined by performing the union of all similar rule restrictions from all of the one or more rule scenarios.

3. The automated system of claim 1 wherein different rule scenarios apply to different trip segments of the already-issued ticket.

4. The automated system of claim 1 wherein the second web page or the popup window is configured to call the online ticket changer and to send to the online ticket changer a travel change request for travel solutions complying with one of the change options and restrictions corresponding to the second web page or the popup window associated with the one of the change options and restrictions.

5. The automated system of claim 1 wherein the link to a popup window is clickable and rollover.

6. The automated system of claim 1 wherein the computer is configured to deliver the information to the requester within the first web page about the change options and restrictions prior to receiving, at the online ticket changer, a request from the requester to change the already-issued airline ticket.

7. A method for handling a travel change request, the method comprising:
receiving, at a computer of an automated system, a ticket reference from a requester;
receiving, at the computer, an already-issued ticket retrieved based upon the ticket reference;
receiving, at the computer, one or more rule scenarios governing permitted changes to the already-issued ticket;
combining, at the computer, the one or more rule scenarios into a plurality of options and restrictions and a positive indication of allowability or a negative indication of allowability for each of the change options and restrictions, at least one of the change options and restrictions selected from the group consisting of ticket reissue, ticket change, and route change;
displaying information within a first web page to the requester about the change options and restrictions and about the positive indication of allowability or the negative indication of allowability for each of the change options and restrictions, the first web page configured to present the positive indication or the negative indication for each of the change options and restrictions as a hyperlink to a second web page or as a link to a popup window.

8. The method of claim 7 wherein combining the retrieved one or more rule scenarios into a set of permitted options and restrictions comprises:
invoking a requester decision module to present to the requester the change options and restrictions associated with the already-issued ticket.

9. The method of claim 7 further comprising:
activating the hyperlink or the link corresponding to one of the change options and restrictions to indicate the travel change request; and
in response to activating the hyperlink or the link, displaying the second web page or the popup window corresponding to the one of the change options and restrictions.

10. The method of claim 9 further comprising:
calling an online ticket changer from the second web page or the popup window;

sending the one of the change options and restrictions from the second web page or the popup window to the online ticket changer; and determining one or more travel solutions complying with the one of the change options and restrictions.

11. The method of claim 9 further comprising:

displaying the one or more travel solutions to the requester.

\* \* \* \* \*

UNITED STATES PATENT AND TRADEMARK OFFICE
CERTIFICATE OF CORRECTION

PATENT NO. : 8,589,211 B2
APPLICATION NO. : 11/855406
DATED : November 19, 2013
INVENTOR(S) : Sebastien Berthaud et al.

It is certified that error appears in the above-identified patent and that said Letters Patent is hereby corrected as shown below:

In the Claims

At column 11, claim number 1, line number 60, after "reissue" insert --,--

Signed and Sealed this
Fourth Day of March, 2014

Michelle K. Lee
*Deputy Director of the United States Patent and Trademark Office*